United States Patent [19]
Claus et al.

[11] Patent Number: 5,559,313
[45] Date of Patent: Sep. 24, 1996

[54] CATEGORIZATION OF PURCHASED ITEMS FOR EACH TRANSACTION BY A SMART CARD

[75] Inventors: David M. Claus; Kevin D. Murphy; Wanda G. Thompson, all of Indianapolis, Ind.

[73] Assignee: Lucent Technologies Inc., Murray Hill, N.J.

[21] Appl. No.: 370,778

[22] Filed: Dec. 23, 1994

[51] Int. Cl.⁶ .................................................. G06K 19/07
[52] U.S. Cl. ..................................... 235/380; 364/401 R
[58] Field of Search ........................ 235/380; 364/401, 364/402, 406

[56] References Cited

U.S. PATENT DOCUMENTS

| | | | |
|---|---|---|---|
| 4,295,898 | 1/1989 | Bernstein et al. | 235/487 |
| 4,798,322 | 1/1989 | Bernstein et al. | 235/487 |
| 4,802,080 | 1/1989 | Bossi et al. | 363/75 |
| 5,047,614 | 9/1991 | Bianco | 235/385 |
| 5,233,547 | 8/1993 | Kapp et al. | 364/705.02 |
| 5,250,789 | 10/1993 | Johnson | 235/383 |
| 5,401,946 | 3/1995 | Weinblatt | 235/383 |

FOREIGN PATENT DOCUMENTS

| | | | |
|---|---|---|---|
| 214653 | 3/1987 | European Pat. Off. | 235/386 |
| 1-199292 | 8/1989 | Japan | 235/449 |
| 2-226394 | 9/1990 | Japan | 235/380 |

*Primary Examiner*—John Shepperd
*Attorney, Agent, or Firm*—John C. Moran

[57] ABSTRACT

A smart card that is responsive to a list of items with individual prices that are received from a point of sale (POS) terminal during an individual transaction to automatically insert these items into expense categories. A personal computer later retrieves these categories and associated information and inserts the information into a spreadsheet. The microprocessor in the smart card relies on stored tables defining commonly used item designations and a table that defines definitions based on an ongoing learning process by the microprocessor in conjunction with the personal computer.

30 Claims, 13 Drawing Sheets

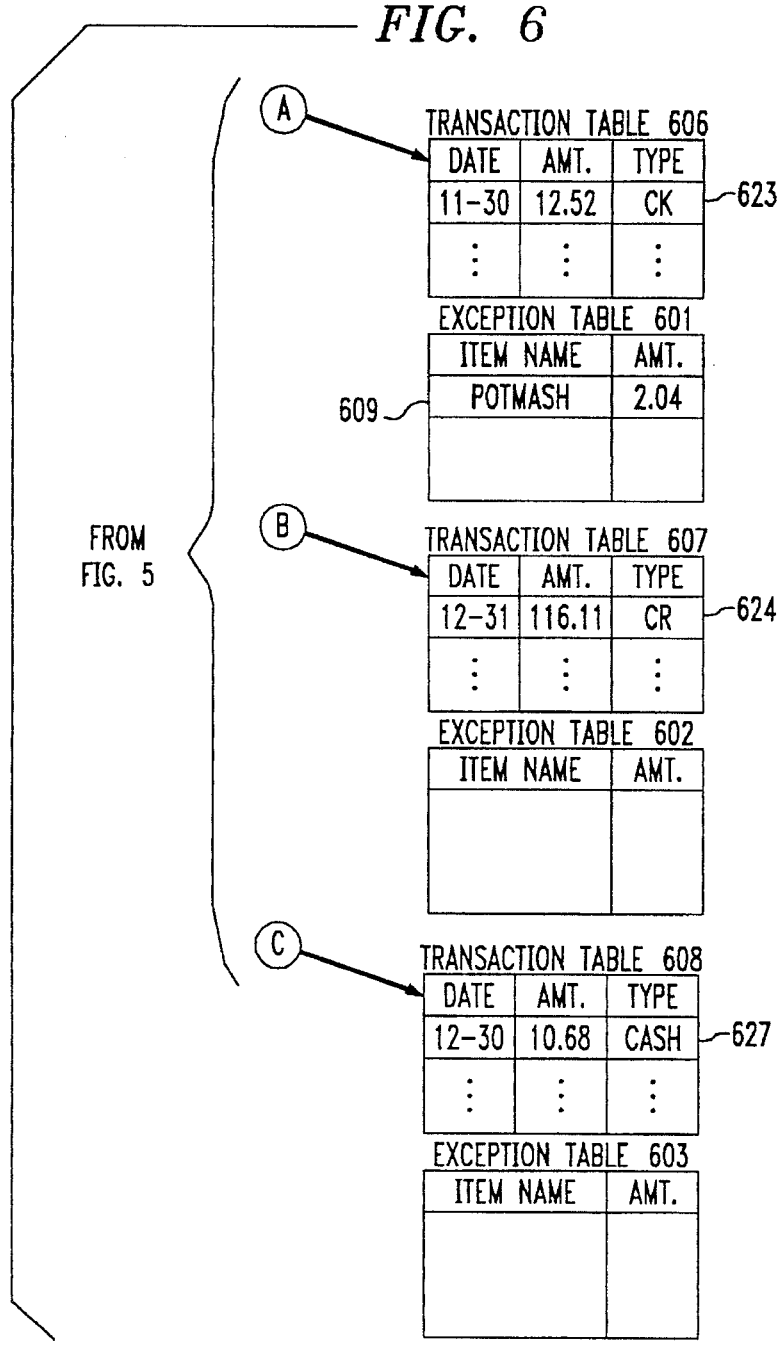

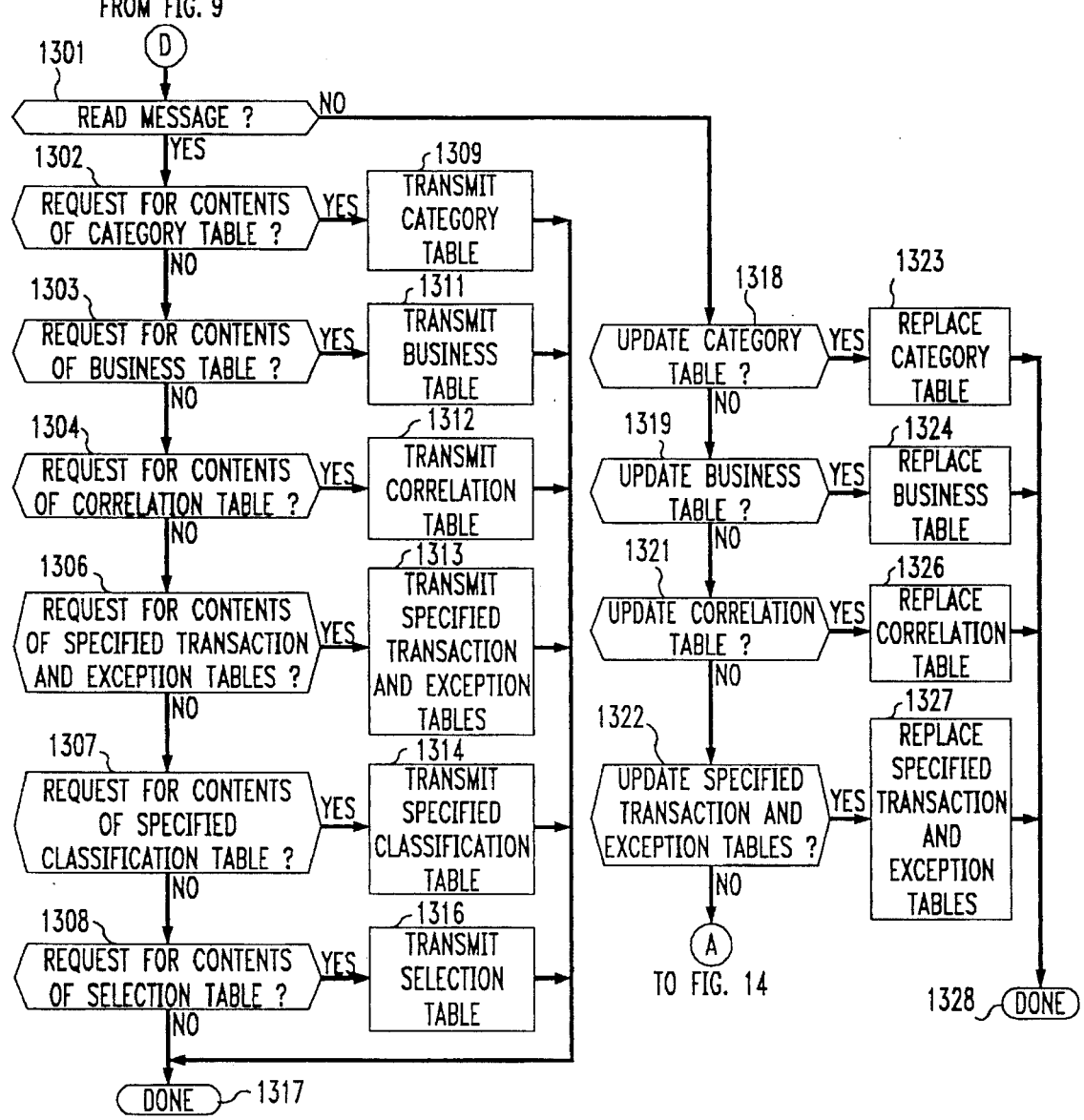

FIG. 15

PC CATEGORY TABLE 1503

| CATEGORY NAME | CATEGORY NO. | TOTAL AMT. |
|---|---|---|
| FOOD | 1 | 16.27 |
| HOME LIQUOR | 2 | 4.99 |
| ... | ... | ... |
| ENTERTAINMENT | 30 | 116.11 |

PC INDUSTRY TABLE 1506

| INDUSTRY NAME | TABLE NO. |
|---|---|
| FOOD | 501 |
| HARDWARE | 501 |
| FURNITURE | 502 |
| ... | ... |

PC CODE TABLE 1509

| CODE NO. | CODE NAME |
|---|---|
| 1 | BEVERAGE |
| 2 | BAKED GOODS |
| 3 | ALCOHOL |
| ... | ... |
| 1200 | DINING |
| ... | ... |

PC BUSINESS TABLE 1504

| TYPE NAME | BUS. TYPE | BUSINESS NAME | TABLE NO. | POINTER |
|---|---|---|---|---|
| BASIC | B | SAFEWAY 92 ST | 501 | |
| ENTERTAINMENT | E | BRIARWOOD RSTR | 501 | |
| BASIC | B | ACE HARDWARE 120AV | 502 | |
| ... | ... | ... | ... | ... |
| BASIC | B | BURGER KING 120AV | 501 | |

PC CLASSIFICATION TABLE — 1501
PC CLASSIFICATION TABLE — 1502
PC CORRELATION TABLE — 1507
PC SELECTION TABLE — 1507
PC LEARNING TABLE — 1508
1531
PC TRANSACTION TABLE / PC EXCEPTION TABLE — 1511
...
PC TRANSACTION TABLE / PC EXCEPTION TABLE — 1512

5,559,313

CATEGORIZATION OF PURCHASED ITEMS FOR EACH TRANSACTION BY A SMART CARD

TECHNICAL FIELD

This invention relates to the collection of financial information, more particularly, it relates to the categorization of individual items for each transaction by a smart card.

BACKGROUND OF THE INVENTION

One of the problems experienced by individuals in trying to keep accurate records is the problem of capturing and storing data into a computer spread sheet program or some other type of computer program. This problem is increased by the retail stores that sell a wide variety of goods under one roof. For example, large stores may sell groceries, pharmaceuticals, clothing, sporting equipment, furniture, etc. The result is that even when an individual has retained the credit card receipt or entered the total amount in a check book register at such a store, a single purchase may include a number of categories for an individual's budget. At present, the only way of handling this problem is to retain the sales receipt and mutually enter each item on the sales receipt into the proper category of a spreadsheet program. This is a laborious and error prone method. The end result is that the vast majority of people do not maintain accurate personal or business records for their transactions that involve cash, check, debit cards, or credit cards. The reason is simply that a single trip to a large store will result in the purchase of items that may fall into five or more different categories of a budget.

SUMMARY OF THE INVENTION

The foregoing problems are solved and a technical advance is achieved by a smart card that is responsive to a list of items with individual prices that are received from a point of sale (POS) terminal during an individual transaction to automatically insert these items into expense categories. A personal computer later retrieves these categories and associated information and inserts the information into a spreadsheet. Advantageously, the microprocessor in the smart card relies on stored tables defining commonly used item designations and a table that defines definitions based on an ongoing learning process by the microprocessor in conjunction with the personal computer.

BRIEF DESCRIPTION OF THE DRAWING

FIGS. 5–7 illustrate the relationship of tables maintained in the memory of the smart card of FIGS. 1 and 4;

FIG. 12 illustrates the learning table maintained by a smart card;

FIGS. 13 and 14 illustrate, in flow chart form, the operations performed by a smart card in interacting with a personal computer;

FIG. 15 illustrates the tables maintained by a personal computer for interaction with a smart card.

DETAILED DESCRIPTION

Figure 1:
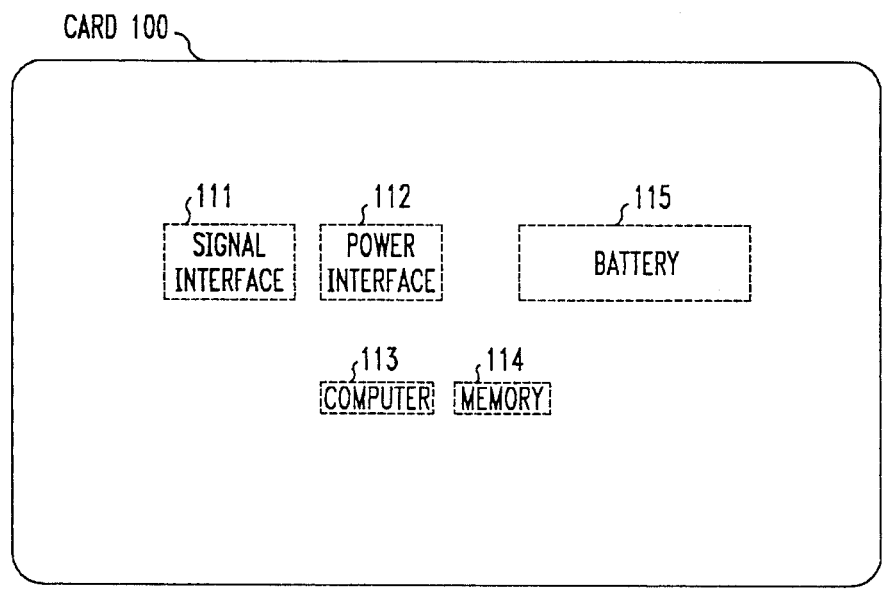
FIG. 1 illustrates a pictorial representation of a smart card in accordance with the invention.
Figure 2:
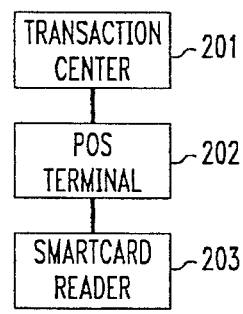
FIG. 2 illustrates the arrangement of a transaction center, POS terminal, and a smart card reader.
Figure 4:
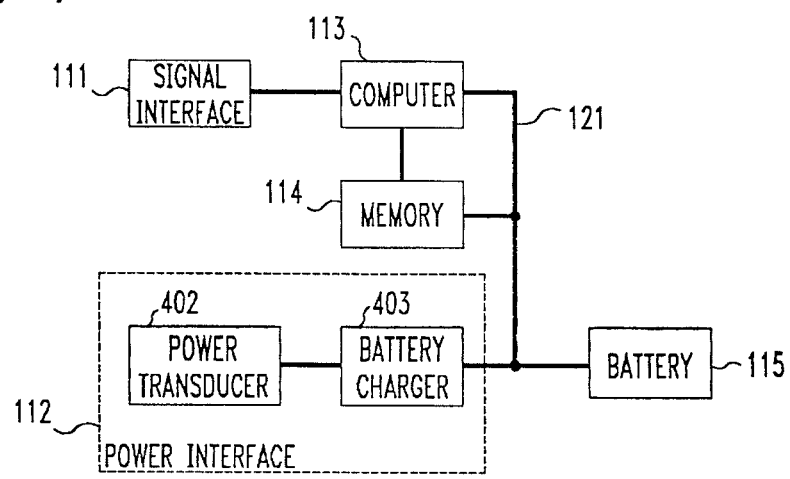
FIG. 4 illustrates, in block diagram form, the circuitry of the smart card of FIG. 1.

Smart card 100 is pictorially illustrated in FIG. 1 and illustrated in block diagram form in FIG. 4. During a transaction with a POS terminal such as POS 202 of FIG. 2, smart card 100 receives the itemized list of purchases as digital information from POS terminal 202 via smart card reader 203. In addition, smart card 100 receives the name of the store, total amount, and type of transaction. The transaction type may be cash, check, debit card, or credit card. Smart card 100 is responsive to this itemized list to access the item code, access the type of business code, and determine the category into which each listed item is to be assigned. Each assigned category has its total incremented by the amount of each item assigned to it. In addition, the total amount of the transaction, date, transaction type and business name is stored for later correlation with a bill from the institution handling that particular transaction type. Periodically, the user of card 100 utilizes personal computer 340 of FIG. 3 to read the total amounts for each category, and the transaction information. In addition, the user of smart card 100 utilizes personal computer 340 to update information in smart card 100 utilized to determine categories.

Figure 3:
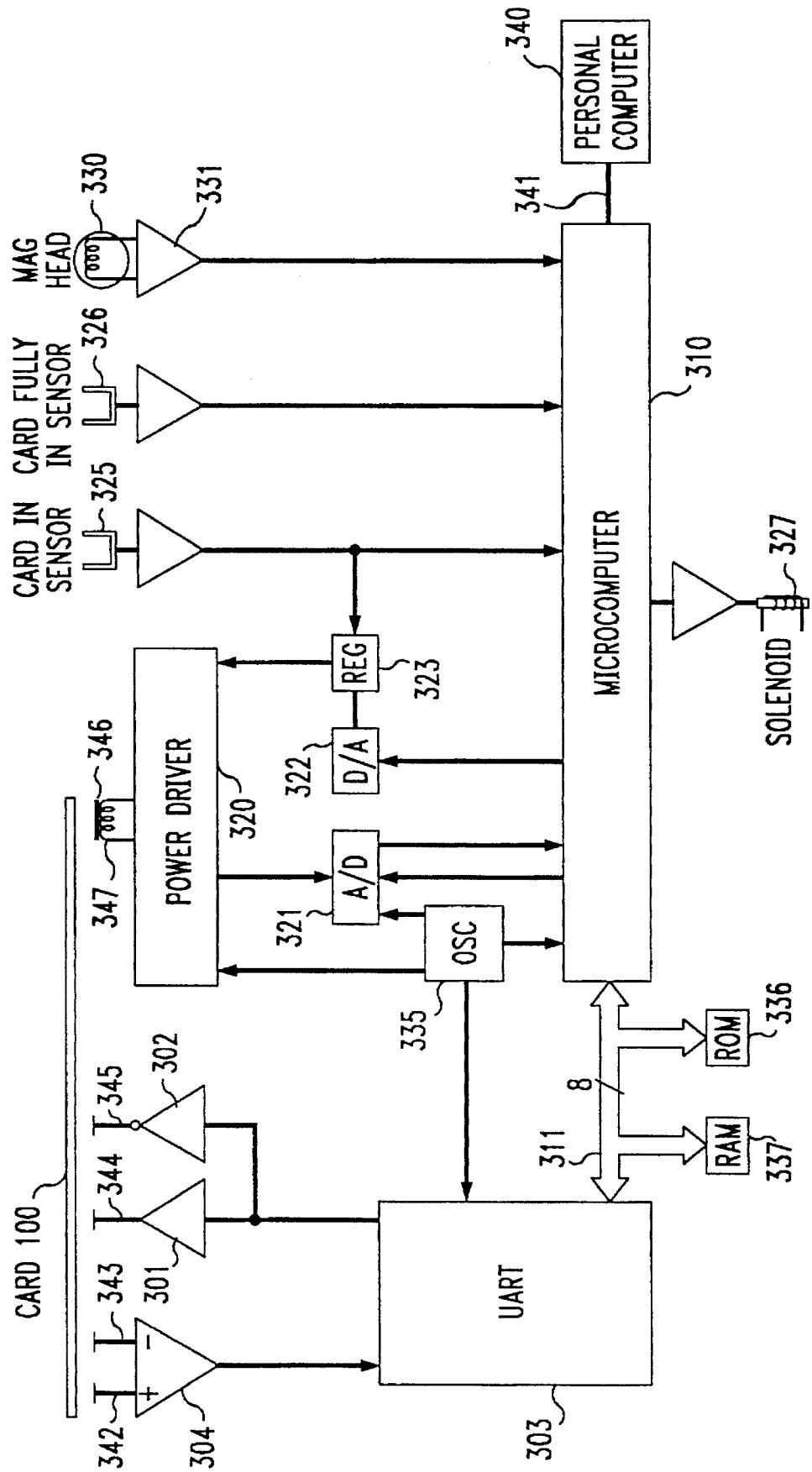
FIG. 3 illustrates a personal computer with an attached smart card reader.

FIG. 3 illustrates a personal computer and a card unit for writing and reading information into smart card 100. The card reader is comprised of elements 303–337. These elements are described in detail in U.S. Pat. No. 4,798,322. The latter patent shows that an application station rather than personal computer 340 is communicating data with computer 310 and also shows a plurality of individual connectors for the communication of the data between the application station and microcomputer 310. In FIG. 3, personal computer 340 utilizes link 341 which is a serial link to communicate information with computer 310 and personal computer 340.

FIG. 4 illustrates, in block diagram form, smart card 100 of FIG. 1. The smart card receives power via power interface 112 which is shown in greater detail in FIG. 4 as comprising power transducer 402 and battery charger 403 and as set forth in U.S. Pat. No. 4,802,080 which is hereby incorporated by reference. Smart card 100 communicates signals with outside devices via signal interface 111 using a capacitively coupled mechanism as is set forth in U.S. Pat. No. 4,795,898 which is also hereby incorporated by reference. Computer 113 provides overall control for smart card 100. Power for smart card 100 is provided by battery 115 which is charged by an external device via interface 112. The latter interface includes power transducer 202 and battery charger 203. Computer 113 maintains all tables and lists in memory 114. In addition, computer 113 maintains in memory 114 credit and debit card numbers that are transmitted upon request to a POS terminal to allow card transactions.

Figure 5:
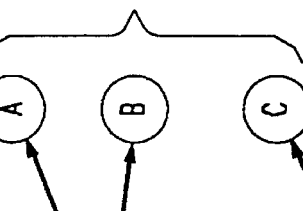

FIGS. 5–7 illustrate the tables that are utilized by computer 113 of smart card 100 to determine categories. There are a plurality of classification tables 501–502. These tables contain the alphanumeric descriptions utilized for a particular industry. Associated with each item is a code number. Each code number designates a particular product or service and is utilized identify the same product or service in the different classification tables. Business table 504 lists the name of the business and the business type. On FIG. 5, only basic and entertainment types are illustrated; however, one skilled in the art could readily come up with a plurality of business types. Correlation table 531 is utilized to determine the category number in response to a code number and a business type. Category table 503 maintains the total amount of money spent for each particular category. Transaction tables 606, 607, and 608 of FIG. 6 maintain the date, amount, and transaction type of an individual transaction by business. Exception tables 601, 602, and 603 maintain the item name and price for any item that could not be found in the classification tables. Each exception table is associated with a business. Using a personal computer, the user reads smart card 100 and can determine the code numbers for items in the exception tables. For an item that will not be purchased for some long period of time, the user can choose not to assign a code number to that item.

The following two examples of transactions are given to illustrate how the tables of FIGS. 5 and 6 are utilized. In the first example, the user of smart card 100 has purchased the following items from Safeway: potato masher at $2.04, coffee at $4.79, a bakery item at $0.70, and a six pack of beer at $4.99. Computer 113 first searches business table 504 to find the entry for the Safeway that is located at 92nd Street. After determining that line 518 of business table 504 has the entry for Safeway, computer 113 accesses the table number field of line 518 and determines that classification table 501 is to be initially searched. Computer 113 then searches classification table 501 looking for the item named "coffee". This item appears in line 511 and has a code number of "1". Computer 113 then returns to line 518 of business table 504. Line 518 designates that the business type is "B". Computer 113 accesses correlation table 531. It utilizes the business type of "B" in row 533 and the code number of "1" in column 532. The column and row designate that entry 541 in category number column 534 is the correct category number which is "1". Using the category number, computer 113 accesses category table 503 and adds the price of the coffee into the total amount of line 521. (Note, that the amount of $16.27 illustrated in line 521 will only be correct after both examples have been described.)

Next, computer 113 searches classification table 501 for the item marked as "bakery". The code number for "bakery" is "2" in classification table 501. Once again, computer 113 utilizes line 518 of business table 504 to determine the business type. The code number and business type determine that entry 542 of category column 534 is the correct category number. Entry 542 contains category number "1". Computer 113 is responsive to this category number to add the amount of the bakery item, $0.70, into the total amount field of line 521.

Next, computer 113 searches classification table 501 for the item entitled beer. This item name is found in line 513 and has a code number of "3". Using this code number and the business type from line 518, computer 113 accesses correlation table 531 and determines that entry 543 of category number column 534 contains the correct category number. The user of smart card 100 has decided to separate alcohol purchases for normal consumption from food purchases. Hence, the user has designated another category for alcohol purchases. This other category is designated by category number "2". Consequently, computer 113 accesses category table 503 and adds the price of the beer into the total amount field of line 522.

Finally, computer 113 searches classification table 501 for the potato masher which is designated in the item names received from POS terminal 202 as "potmash". This item name is not found in classification table 501. Computer 113 then accesses selection table 701 of FIG. 7. The table number inserted in business table 504 of FIG. 5 is the primary choice listed in selected table 701. Computer 113 determines that line 702 contains the primary choice of "501 ". Computer 113 then accesses the second choice field of line 702 and determines that classification table 502 of FIG. 5 is to be searched next for the item name. In the present example, the search of classification table 502 also fails. Classification table 502 contains items names normally utilized by hardware stores. The third choice field entry of line 702, which is "706", defines item names that are normally used in the clothing store industry. Classification table 706 is not illustrated but it would be searched in the present example. Computer 113 continues to search classification tables defined in line 702 of FIG. 7. In the present example, computer 113 does not find a match in any of these tables. Computer 113 then utilizes the contents of the pointer field of line 518 of FIG. 5 to access exception table 601 of FIG. 6. Computer 113 inserts into line 609 the item name of "potmash" and the amount $2.04. When the user uses a personal computer to read the information from smart card 100, the user can assign the item name "potmash" a code number. Personal computer 340 is responsive to this code number to store the code number in the classification table designated by the user. In this manner, personal computer 340 and computer 113 of smart card 100 function together to build an expert system.

Consider now the second example of the user of card 100 visiting two types of restaurants. The user has determined that meals purchased at Burger King are not entertainment but rather are basic living costs. On the other hand, the user has determined that meals purchased at the Briarwood Restaurant constitute entertainment. Smart card 100 is responsive to a transaction for food purchased at a Burger King to perform the following operations. First, computer 113 determines that classification table 501 is utilized for Burger King Restaurants by accessing line 526 of business table 504. Computer 113 searches classification table 501 for a match on the word "food". This match is found in line 514 which has a code number of "1200". Computer 113 accesses line 526 of business table 504 and determines that the business type for Burger King is "B". (Business table 504 allows for the fact that the user may visit Burger Kings at a number of different locations.) Computer 113 then accesses correlation table 532 with code number "1200" and business type "B". A match is found in entry 544 of category number column 534. Computer 113 then is responsive to the category number to access category table 503 and add the amount of the meal at Burger King, $10.68, into the total amount field of line 521.

In response to transaction information received at the Briarwood Restaurant, computer 113 accesses business table 504 and finds a match for the Briarwood Restaurant on line 519 and determines from the table number entry of line 519 that classification table 501 is to be used. The transaction information includes beer and food and classification table 501 for beer has a code number of "3". From line 519, computer 113 determines that the business type is "E". Upon accessing correlation table 531, computer 113 finds a match for the code number and the business type in entry 546 of category number column 536. Computer 113 is responsive to the category number "30" found in entry 546 to access category table 503 and add the price of the beer into the total amount field of line 528. The price of the food at the Briarwood Restaurant is handled in a similar manner with the exception that entry 547 of category number column 536 is utilized.

Consider the utilization of transaction tables 606, 607, and 608. When the transaction at Safeway takes place, computer 113 accesses line 518 of business table 504. Computer 113 utilizes the information in the pointer field of line 518 to locate transaction table 606 in memory 114. Computer 113 then inserts into line 623 the date, mount, and transaction type, e.g. credit card. The transaction type is transmitted to computer 113 by the POS terminal. Line 624 of transaction table 607 and line 627 of transaction 608 are similarly processed for the transactions at Briarwood and Burger King, respectively.

Figure 8:
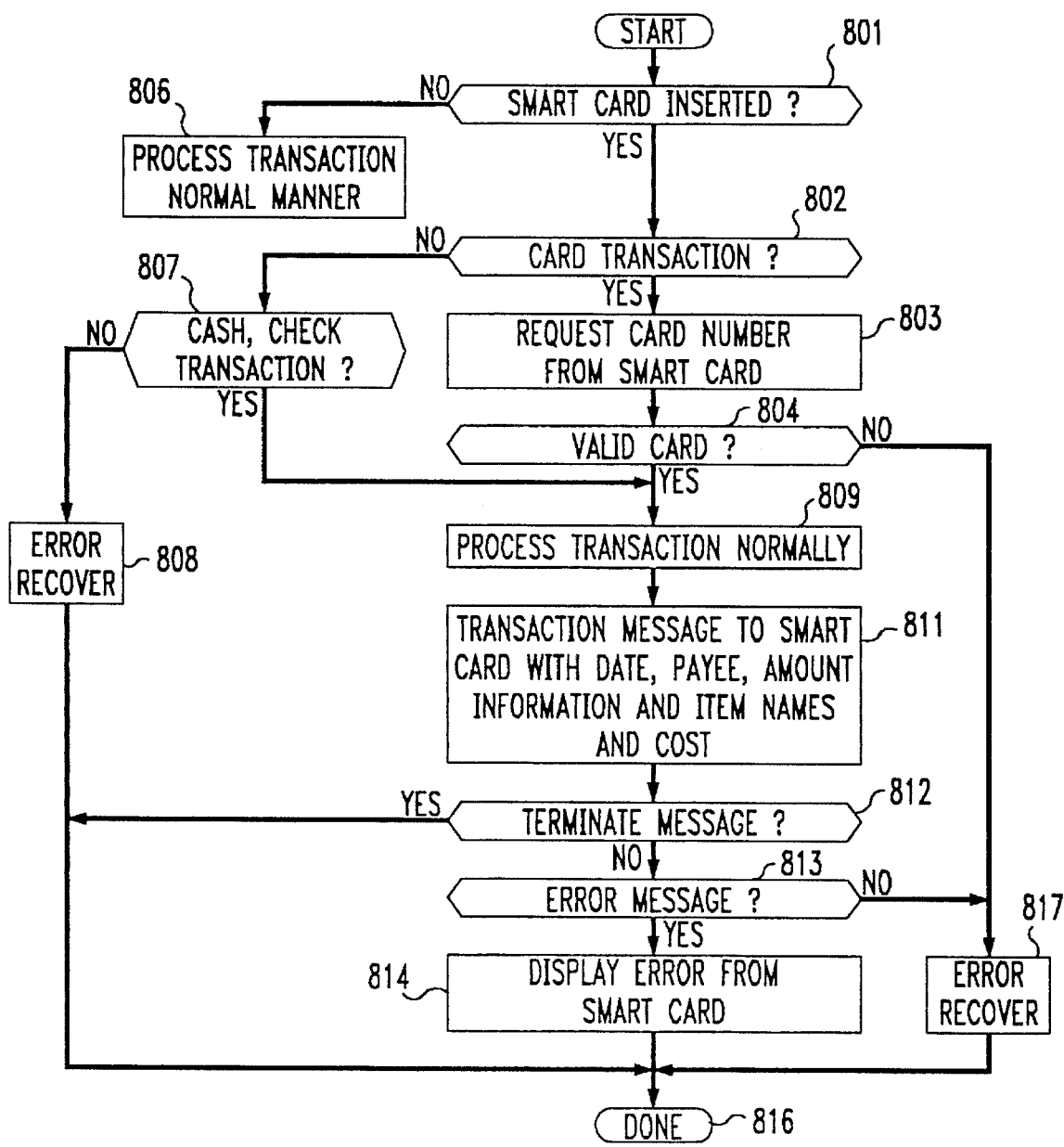
FIG. 8 illustrates, in flow chart form, the operations performed by a POS terminal.

FIG. 8 illustrates in flow chart form, the operations performed by POS terminal 202 with respect to smart card 100. First, decision block 801 determines whether a smart card has been inserted into POS terminal 202. If the answer is no, control is transferred to 806 for normal processing. If the answer is yes, control is transferred to decision block 802. The latter decision block determines if POS terminal 202 is performing a credit card type transaction. If the answer is no, POS terminal 202 determines if it a cash or check transaction. If the answer is no, control is transferred to block 808 for error recovery. If the answer is yes, control is transferred to block 809. Returning to decision block 802, if the answer is yes, control is transferred to block 803, which requests the credit card number from smart card 100. Decision block 804 determines if the credit card number is valid by POS terminal 202 transmitting messages to transaction center 201. If it is not a valid credit card, control is transferred to block 817 for error recovery. If it is a valid credit card, control is transferred to 809 which does the normal transaction processing such as printing a bill and updating internal values within POS terminal 202 and transaction center 201. After execution of block 809, block 811 transmits a transaction message to smart card 100 including the date, payee, and amount of the transaction. Decision block 812 is executed to await the arrival of a message. When a message arrives, decision block 812 transfers control to block 816 if the message is a terminate message. If the answer is no, control is transferred to decision block 813 which tests if the received message is an error message. If the answer is no, control is transferred to block 817 for error recovery. If the answer is yes in decision block 813, control is transferred to block 814 which displays an error from smart card message on POS terminal 202. After execution of block 814, control is transferred to block 816.

Figure 9:
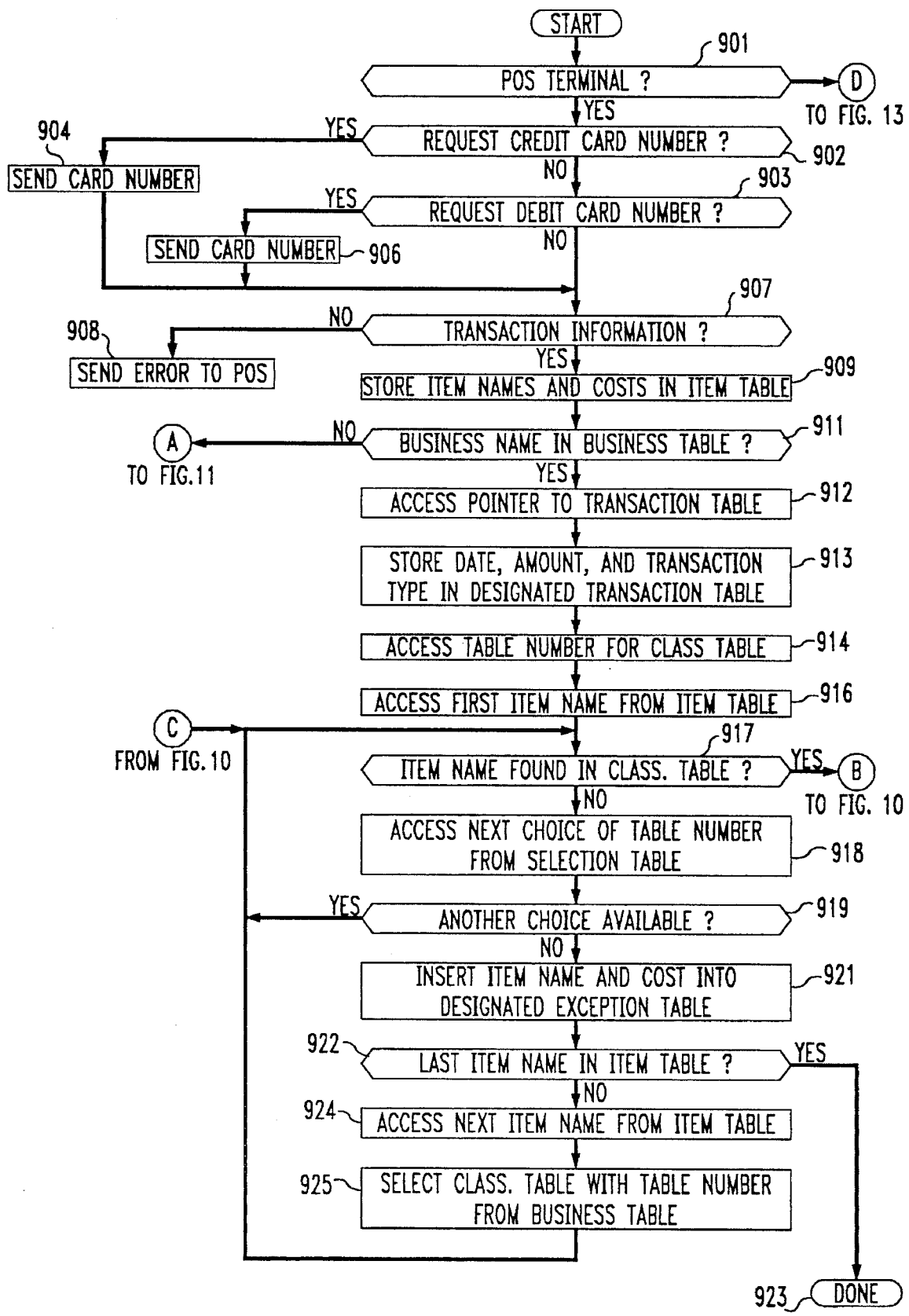
FIGS. 9–11 illustrate, in flow chart form, the operations performed by a smart card in interacting with a POS terminal.
Figure 10:
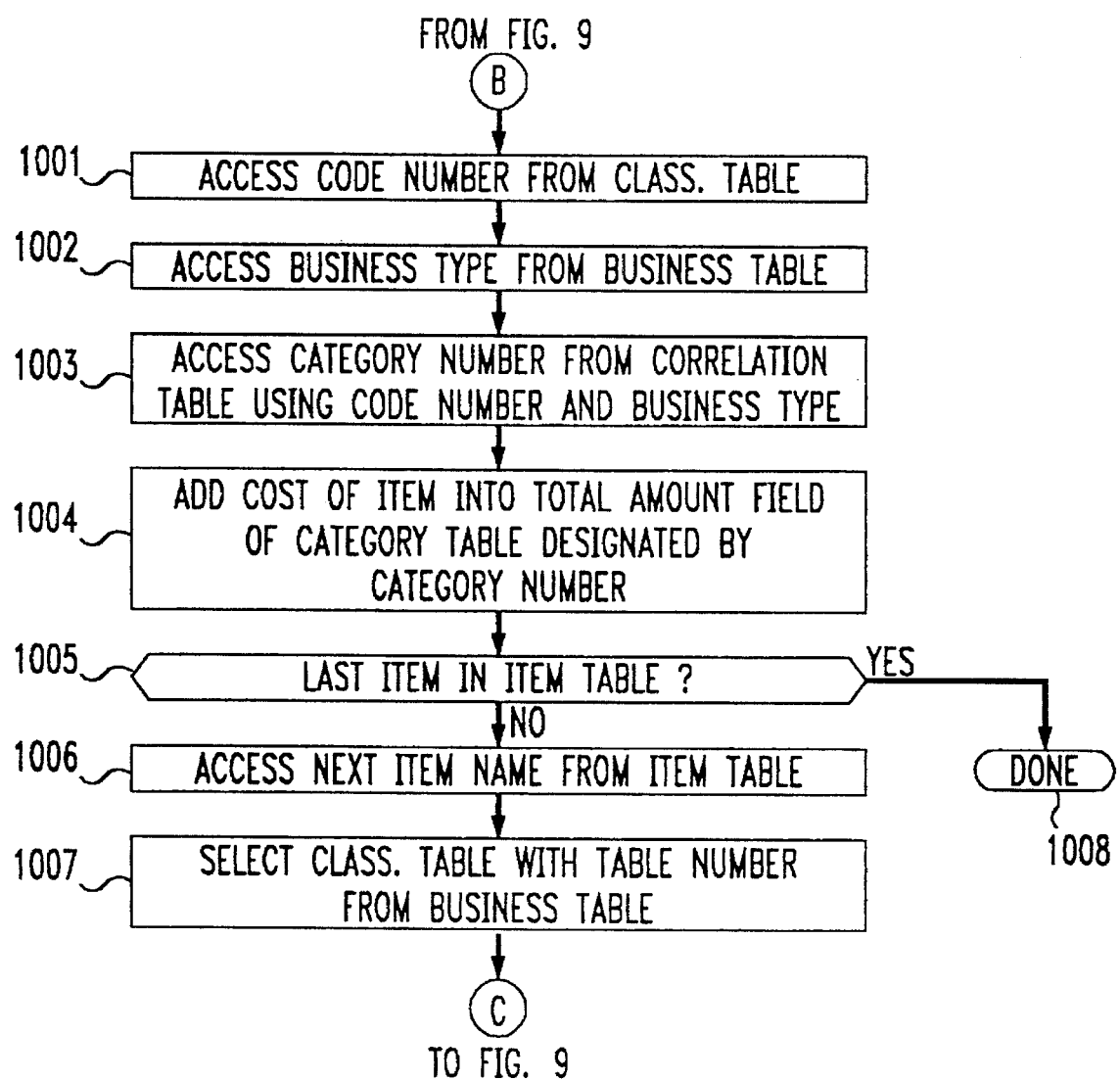
Figure 11:
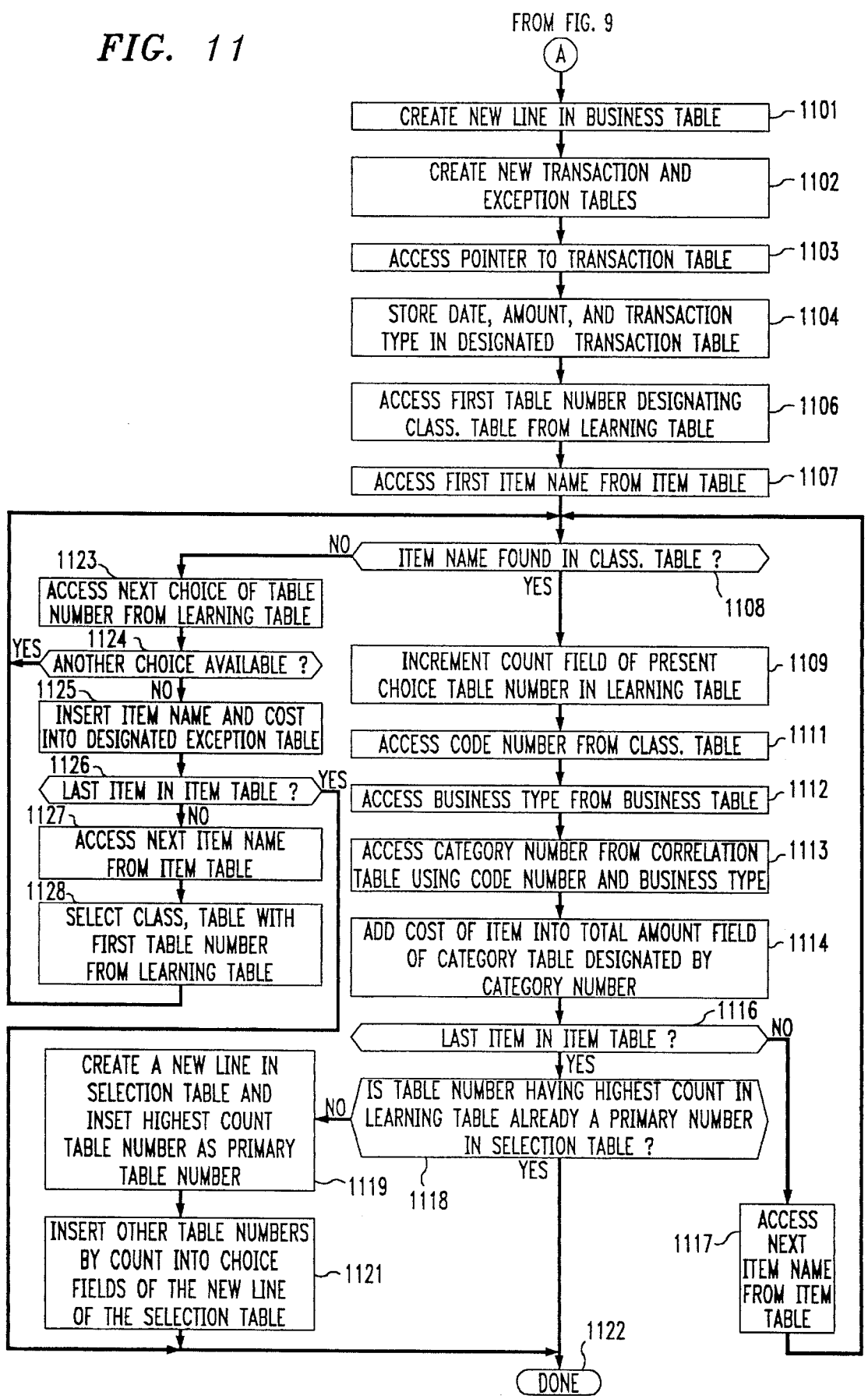
Figure 14:
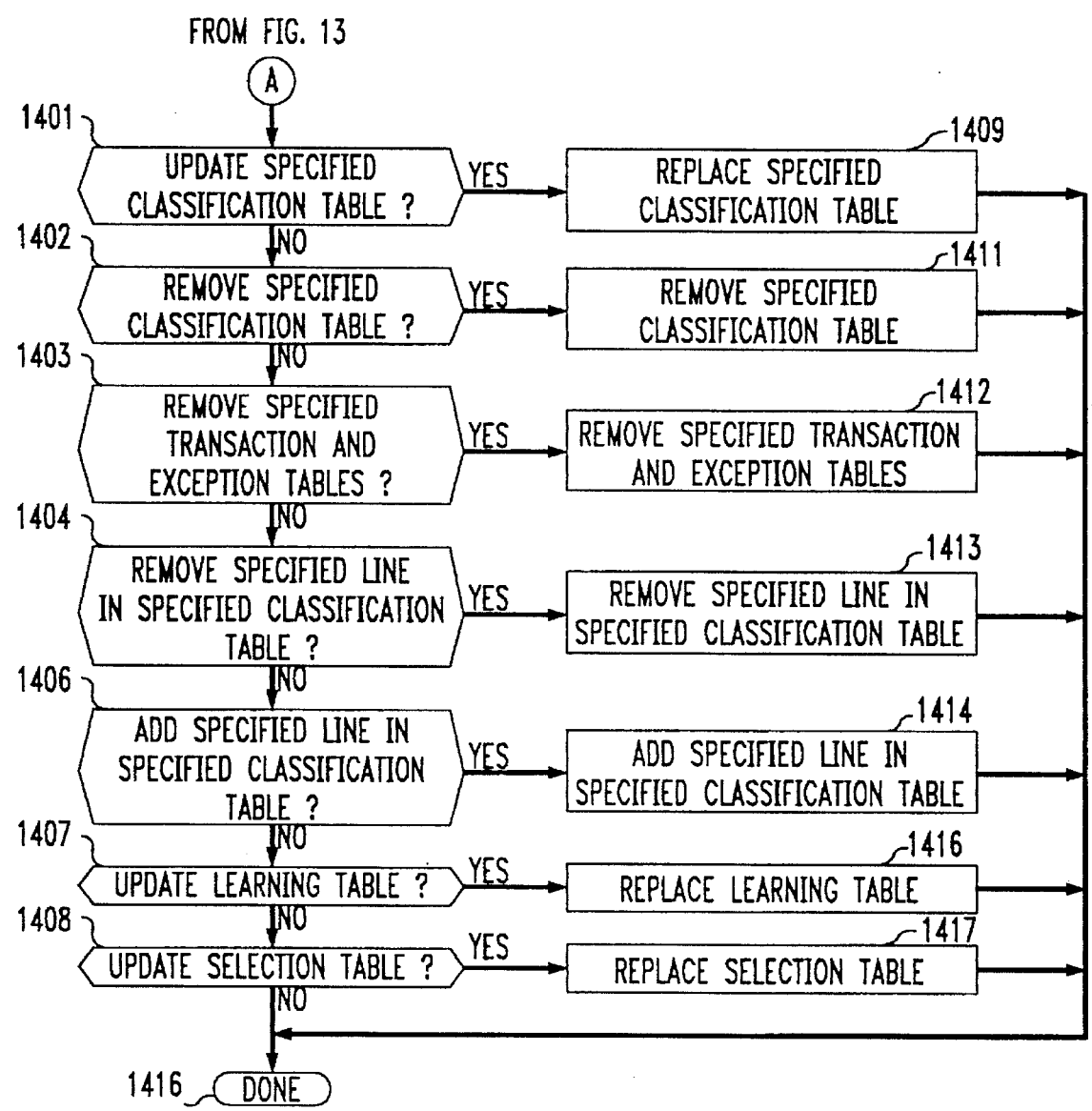

FIGS. 9, 10, and 11 illustrate the operations performed by computer 113 using the tables illustrated in FIGS. 5, 6, 7, and 12. Decision block 901 determines whether data is being received from the POS terminal. If the answer is yes, control is transferred to decision block 902 which determines if a request is being made for a credit card number. If the answer is yes, block 904 transmits the credit card number to the POS terminal and transfers control to decision block 907. If the answer in decision block 902 is no, control is transferred to decision block 903 which determines if a debit card number is being requested. If the answer is yes, decision block 906 transmits the debit card number to the POS terminal and transfers control to decision block 907. If the answer in decision block 903 is no, control is transferred to decision block 907. If the POS terminal is not transmitting transaction information, control is transferred to block 908 which transmits an error message to the POS terminal. If transaction information is being received, block 909 stores the item names and costs in the item table and transfers control to decision block 911. The latter block determines if the business name received in the transaction information is found within the business table. If the user had previously made transactions with the business, the business name should be in the business table. If the business name is found in the business table, the pointer field of the line in the business table that is designated by the business name is accessed to determine the location of the transaction table by execution of block 912. Block 913 then stores the date, amount, and transaction type in the transaction table designated by the pointer field. Next, the table number field is accessed to determine the classification table that is to be used first in finding a match for the item name so as to determine the code number. Block 916 accesses the first item name from the item table and transfers control to decision block 917. Decision block 917 searches the classification table to determine a complete or partial match for the item name. If no match is found in the classification table, control is transferred to block 918. The latter block accesses the selection table to obtain the next choice of a table number that defines a new classification table. The selection table is illustrated in FIG. 7 and has a plurality of choices associated with a primary choice which is the number stored in the table number of the designated line of the business table illustrated in FIG. 5. If another choice is available, decision block 919 transfers control back to block 917 to determine if the item name can be found in the new classification table. If the answer in decision block 919 is no, block 921 inserts the item name and cost into the exception table designated by the pointer field of the selected line of business table 504 of FIG. 5. From block 921, control is transferred to decision block 922 which determines if the last item name in the item table has just been processed. If the answer is yes, the transaction has been completed and control is transferred to block 923. If the answer in decision block 922 is no, control is transferred to block 924 which accesses the next item name from the item table and transfers control to block 926. Block 926 sets the table number back to the number found in the table number field of the designated line of business table 504. This is done since the table number in the table number field should designate a classification table which will contain most of the items bought from the business designating the line in business table 504. From block 926, control is transferred back to decision block 917.

Returning to decision block 917, if the item name was found in the present classification table resulting in a yes answer, control is transferred to block 1001 of FIG. 10. Block 1001 of FIG. 10 accesses the code name from the classification number identified by the item name. Next, block 1002 accesses the business type from the designated line of business table 504 and transfers control to block 1003. The latter block uses the accessed code number and business type to access correlation table 531 to obtain the category number. In response to the category number, block 1004 adds the cost of the item into the total amount field of category table 503 as designated by the category number. Decision block 1005 checks if all items in the item table have been processed. If the answer is yes, control is transferred to block 1008 since processing is complete. If the answer is no, block 1006 then accesses the next item name from the item table and transfers control to block 1007. The latter block uses the contents of the table number field of the designated line of business table 504 to select the classification table that will be utilized. Control is then transferred back to decision block 917 of FIG. 9.

Returning to decision block 911 of FIG. 9, if the business name is not found in business table 504 indicating that the user had never been to that business, decision block 911 transfers control to block 1101 of FIG. 11. Block 1101 creates a new line in business table 504, and block 1102 creates new transaction and exception tables to be used with the new business. The creation of the new transaction and exception tables results in the location of these tables being placed in the pointer field of the new line in the business table. In addition, the business name is also inserted into the new line. Block 1104 stores the date, amount, and transaction type in the new transaction table designated by the pointer field.

Upon receiving control from block 1104, block 1105 determines the business type that is to be inserted into the new business line. This determination is done first by searching to find a partial match within business table 504. For example, if the user has gone to a new Safeway store rather than the Safeway store on 92nd St., the search for a partial match determines that this is another Safeway store and use the business type of B. In addition, computer 113 maintains a table of generic business names and their business types which is searched if the search of business table 504 does not result in a match. The table of generic names for example includes the name "hardware" so that if the user went to a True Value Hardware store rather than an Ace Hardware store, the business type would still be correctly determined. The business type is inserted into business table 504 but is prefixed with a "T" to indicate to the user that this is a new business type. The user will utilize this information when reading the contents of smart card 100 using personal computer 340.

Block 1106 accesses the first table number designating the classification table from learning table 1201 of FIG. 12. Since a new line in business table 504 was just created for this new business, there is no entry in the table number field of that line in business table 504. The operations illustrated in FIG. 11 are partially directed to determining the table number that should be inserted into the new table number field and also to determining a new line in selection table 701. A new line will only be added to selection table 701 if the classification table identifying the greatest number of item numbers does not appear as a primary number already in selection table 701. In the present embodiment, the table number field of business table 504 and the numbers inserted into a possible new line in selection table 701 are determined on the user's first visit to the new business. However, one skilled in the art could readily see that an additional field could be added to each line of business table 504. This new field would designate the total numbers of visits that the user had made to a particular business until the number reached some predetermined maximum. This predetermined maximum could be checked in decision block 911. If the contents of the new field did not equal the predetermined number, decision block 911 would increment the field and transfer control to block 1105.

Block 1106 accesses learning table 1201 for the first entry which is illustrated to be entry 1202 which defines that classification table 501 is utilized first. The contents of the table number field, i.e. 1202–1204 could be a random sequence of classification table numbers or could be initially tailored to the user's buying habits. The count field is utilized to count the number of items that were found in the associated classification table. After determining the classification in block 1106, block 1107 accesses the first item name from the item table and transfers control to decision block 1108 which determines if the item name is found in the classification table. If the item is not found, the operation of blocks 1123–1127 correspond to the operations of blocks 918–924 of FIG. 9. After execution of block 1127, block 1128 selects the next classification table to be used in block 1108 by reusing the first table number from learning table 1201 of FIG. 12 before transferring control back to decision block 1108.

Returning to decision block 1108. If the item name is found in the present classification table, decision block 1108 transfers control to block 1109 which increments the count field associated with the present choice table number in learning table 1201. Next, blocks 11–17 are executed and perform the same functions as previously described for blocks 1001–1006 of FIG. 10 with the exception of the operation of decision block 1116. If the last item in the list table has been processed, decision block 1116 transfers control to decision block 1118. The latter decision block examines the contents of learning table 1201, determines the count field having the largest number, and determines if the associated table number of that count field is already a primary number in selection table 701. If the table number of learning table 1201 having the highest count is already a primary number in selection table 701, a new line is not added to selection table 701. However, if the table number having the highest count is not a primary number in selection table 701, decision block 1118 transfers control to block 19. The latter block creates a new line in the selection table and inserts the table number having the highest count as the primary number in the newly created line. Block 1112 then inserts the other table numbers of learning table 1201 into the newly created line of selection table 701 in a sequence determined by the size of the count fields.

Figure 16:
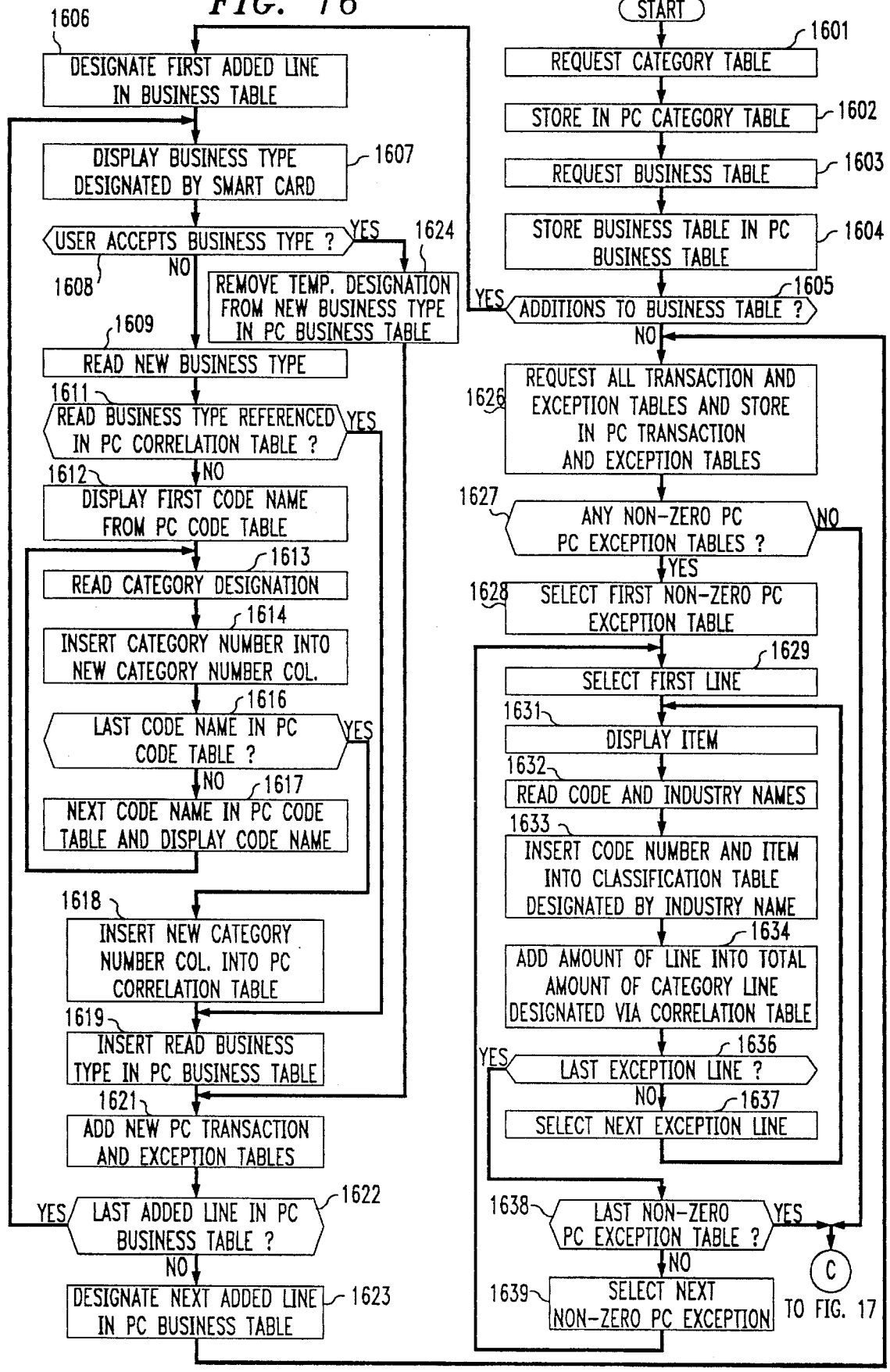
FIGS. 16 and 17 illustrate, in flow chart form, the operations performed by a personal computer in interacting with a smart card.
Figure 17:
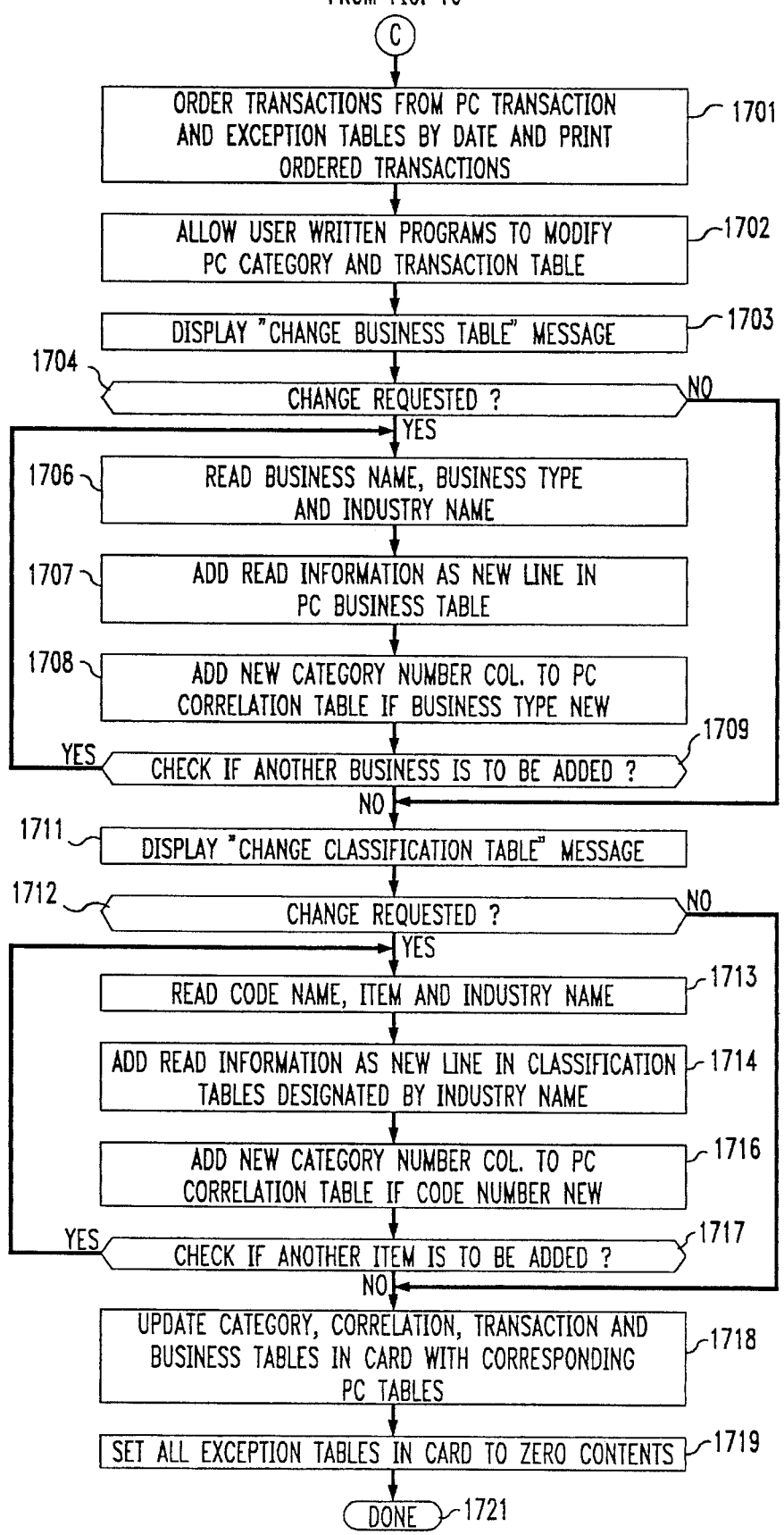

FIGS. 16 and 17 illustrate, in flow chart form, the operations performed by personal computer 340 of FIG. 3. These operations are performed in conjunction with the tables illustrated in FIG. 15. In FIG. 15, tables 1501–1504 and 1531 include the same information as tables 501–504 and 531, respectively, of FIG. 5 with additional descriptive terms. PC transaction and PC exception tables 1511 contain the same information as transaction table 606 and exception table 601 of FIG. 6. PC transaction and PC exception tables 1512 contain the same information as exception table 603 and transaction table 608 of FIG. 6. PC selection table 1507 and PC learning table 1508 include the same information as included in selection table 701 of FIG. 7 and learning table 1201 of FIG. 12, respectively.

Consider now the operations performed by personal computer 340. At the start processing, block 1601 requests category table 503 from computer 113 in smart card 100, and block 1602 stores the category table received from computer 113 in PC category table 1503. Block 1603 then requests business table 504 from computer 113, and block 1604 stores the received business table in PC business table 1504. Decision block 1605 then scans the business type field of the lines stored in PC business table 1504 searching for a business type that starts with the letter "T". This letter indicates that the line is an addition to the business table. If an addition is found, control is transferred to block 1606 which designates the added line found in PC business table 1504 as the first added line. Block 1607 then displays the business type that was designated by the card along with the business name. Decision block 1608 gives the user an opportunity to accept the business type. If the user accepts the business type, control is transferred to block 1624 which removes the temporary designation from the new business type. (Note, that smart card 100 will only designate a business type that already exists.) After execution of block 1624, control is transferred to block 1621 which will be described later. If the answer in decision block 1608 is no, block 1609 gives the user the opportunity to select a new business type and reads this new business type. Decision block 1611 then determines if the read business type is referenced in PC category table 1503. If the answer is yes, control is transferred to block 1619. If the answer is no, it is necessary to add a new category number column to PC correlation table 1531.

In order to add a new column to PC correlation table 1531, it is necessary for the user to sequence through all of the code names given in PC code table 1509 and designate what the category number should be for each of these code names. Block 1612 displays the first code name in PC code table 1509. Block 1613 then reads the category that is designated by the user. The user will designate categories by designating a category name from PC category table 1503. Block 1613 converts this category name into the category number given in PC category table 1503. Block 1614 then inserts the category number into the field in the new category number column designated by the code number selected in block 1613. Decision block 1616 determines if all of the code names in PC code table 1509 have been displayed to the user. If the answer is yes, control is transferred to block 1618. If the answer is no, block 1617 accesses the next code name from PC code table 1509 and displays this code name to the user and transfers control back to block 1613.

Consider now the operations performed by blocks 1618–1623. Block 1618 inserts the newly formed category number column into PC correlation table 1531. Block 1619 inserts the business type received from the user in block 1609 into PC business table 1504. Block 1621 adds new PC transaction and exception tables for the new business line. Decision block 1622 determines if there anymore businesses that have been added to PC business table 1504. If the answer is yes, block 1623 designates the next added line in PC business table 1504 and returns control to block 1607 for processing the next new business. If the answer is no in decision block 1622, control is transferred to block 1626.

Block 1626 requests all transaction and exception tables from computer 113 and stores these tables in the corresponding PC transaction and exception tables. Decision block 1627 scans the PC exception tables to see if any exception lines are present in the exception tables. If the answer is no, control is transferred to block 1701 of FIG. 17. If an exception line has been stored in one of the exception tables, control is transferred from decision block 1627 to block 1628. Blocks 1628–1639 display each of the exception lines to the user and give the user the opportunity to designate the code name and industry for this exception. The industry as illustrated in PC industry table 1506 defines the classification table number. Once the code number and the classification table have been determined, the new code number along with the item is inserted directly into the designated classification table in smart card 100 and into the corresponding PC classification table.

Consider now these operations in greater detail, block 1628 selects the first non-zero PC exception table, and block 1629 selects the first line in that exception table. Block 1631 then displays the item from the designated line in the exception table to the user. Block 1632 reads the code name and industry name entered by the user. Block 1633 then inserts the code number and the item into the classification table in smart card 100 and the PC classification table designated by the industrial name which is converted to a table number via PC industry table 1506. Block 1634 then adds the amount from the AMT field into the category line in PC category table 1503 that is determined via PC correlation table 1531 utilizing the code number and business type. Decision block 1636 determines if this is the last exception line in the present exception table. If the answer is no, block 1637 selects the next exception line and transfers control back to block 1631. If the answer in decision block 1636 is yes, decision block 1638 determines if the last non-zero PC exception table has been processed. If the answer is yes, control is transferred to block 1701 of FIG. 17. If the answer in decision block 1638 is no, control is transferred to block 1639. The latter block selects the next non-zero PC exception table and transfers control back to line 1629.

Block 1701 orders the transactions from PC transaction and exception tables by date and then prints out this ordered list of transactions. This ordered list of transactions, can then be utilized by the user for various purposes. In addition, it would be possible to create three ordered lists. The first list would be the transactions charged to a credit card number, the second list would be transactions paid for by a check or debit card, and the third list would be transactions paid for with cash. One skilled in the art can readily determine other ways of printing the transaction information.

Block 1702 allows user written programs to modify the PC category and transactions tables. These user written programs could for example be used to adjust the category and transactions tables for transactions up to the end of the month. These programs could do a variety of other activities utilizing the information provided in the category and transaction tables.

Blocks 1703–1709 allow the user to add new businesses into the PC business table. Although not illustrated in FIG. 17, one skilled in the art could readily see how to delete items from the various PC tables. Block 1703 displays the message "change business table". Decision block 1704 determines if the user wants to change the business table. If the answer is no, control is transferred to block 1711. If the answer is yes in block 1704, block 1706 reads the business name, business type, and industry name, and block 1707 adds a new line into the PC business table. Block 1708 adds a new category number column to PC correlation table 1531 if the business type is new for the business being added by the user. The operation of block 1708 is similar to the operation of blocks 1612–1618 of FIG. 16. Decision block 1709 then checks to see if the user wishes to add another business. If the answer is yes, control is transferred back to block 1706. If the answer in decision block 1709 is no, control is transferred to block 1711.

Blocks 1711–1717 give the user the ability to add new item and code numbers into specified classification tables. Block 1711 displays the message "change classification table". Decision block 1712 checks to see if the user desires to change a classification table. If the answer is no, control is transferred to block 1718. If the answer in decision block 1712 is yes, control is transferred to block 1713 which reads the code number, item, and industry name entered by the user. The read information is then used to cream a new line in the classification table designated by the industry name. Block 1716 adds a new category number column to PC correlation table 1531 if the code name is new. In addition, block 1716 adds a new code number and code name to PC code table 1509. Decision block 1717 then checks to see if the user wishes to add another item to a classification table. If the answer is yes, control is transferred back to block 1713. If the answer in decision block 1717 is no, control is transferred to block 1718 which updates the category, correlation, transaction, and business tables in smart card 100 with the corresponding PC tables. Block 1719 sets all of the exception tables in smart card 100 to zero contents, and processing is ended by execution of block 1721.

We claim:

1. A smart card for categorizing items of a transaction, comprising:

means for receiving individual item names, item prices, and a business name for a transaction from a point of sale terminal;

means for identifying each item name with a item code;

means for determining a business type from the business name;

means for designating a category for each item name in response to each item code and business type; and means for adding each item price into each designated category with the categories being stored in the smart card.

2. The smart card of claim 1 further comprises means for adding up all of the item prices received for the transaction and storing this sum in one of a plurality of first table that is designated by the business name.

3. The smart card of claim 2 wherein the means for identifying further comprises means for accessing a plurality of classification tables to obtain the item code.

4. The smart card of claim 3 wherein the means for identifying further comprises means for storing the item name and item price in one of a plurality of second tables designated by the business name upon the means for accessing the plurality of classification tables being unable to obtain the item code for the item name from the plurality of classification tables.

5. The smart card of claim 1 wherein the means for determining further comprises means for accessing a business table with the business name to obtain the business type.

6. The smart card of claim 5 wherein the means for determining further comprises means for creating an entry in the business table and means for inserting a business name and a business type into that entry in response to that business name not being found in the business table wherein the business type is determined from the business table and a third table of generic business names.

7. The smart card of claim 6 wherein the classification tables each contain item names used in a particular business sector.

8. The smart card of claim 7 wherein means for identifying further comprises means for maintaining a fourth table with each entry in the fourth table defining an order that the classification tables are to be accessed to identify the item code from the item name.

9. The smart card of claim 8 wherein each entry in the business table includes the business name, business type, and a pointer to an entry in the fourth table.

10. The smart card of claim 9 wherein the means for identifying further comprises means for creating a new entry in the fourth table for the created entry in the business table by counting the number accesses to each of the classification tables to define the order that the classification tables are to be accessed; and means for inserting a pointer into the created entry in the business table to point to the new entry in the fourth table.

11. The smart card of claim 1 wherein the means for designating comprises means for accessing a correlation table with the business type and item code to designate the category.

12. The smart card of claim 10 further comprises means for transmitting the categories and sums, the plurality of first tables, the plurality of second tables, and business table to a personal computer.

13. The smart card of claim 12 wherein the personal computer comprises means for allowing the user of the personal computer to designate a business sector and a business code for each entry in the plurality of second tables in response to the plurality of second tables; and means for updating each classification table whose business sector was designated with the item name and the item code for the entry in the plurality of second tables that caused the designation.

14. The smart card of claim 13 wherein the personal computer further comprises means for updating the correlation table in response to the updating of each classification table.

15. The smart card of claim 14 wherein the personal computer further comprises means for updating the business table in response to the updating of each classification table.

16. A method for categorizing items of a transaction within a smart card, comprising the steps of:

receiving individual item names, item prices, and a business name for a transaction from a point of sale terminal;

identifying each item name with a item code;

determining a business type from the business name;

designating a category for each item name in response to each item code and business type; and adding each item price into each designated category with the categories being stored in the smart card.

17. The method of claim 16 further comprises the step of adding up all of the item prices received for the transaction and storing this sum in one of a plurality of first table that is designated by the business name.

18. The method of claim 17 wherein the the step of identifying further comprises the step of accessing a plurality of classification tables to obtain the item code.

19. The method of claim 18 wherein the the step of identifying further comprises the step of storing the item name and item price in one of a plurality of second tables designated by the business name upon the the step of accessing the plurality of classification tables being unable to obtain the item code for the item name from the plurality of classification tables.

20. The method of claim 16 wherein the the step of determining further comprises the step of accessing a business table with the business name to obtain the business type.

21. The method of claim 20 wherein the the step of determining further comprises the step of creating an entry in the business table and inserting a business name and a business type into that entry in response to that business name not being found in the business table wherein the business type is determined from the business table and a third table of generic business names.

22. The method of claim 21 wherein the classification tables each contain item names used in a particular business sector.

23. The method of claim 22 wherein the step of identifying further comprises the step of maintaining a fourth table with each entry in the fourth table defining an order that the classification tables are to be accessed to identify the item code from the item name.

24. The method of claim 23 wherein each entry in the business table includes the business name, business type, and a pointer to an entry in the fourth table.

25. The method of claim 24 wherein the the step of identifying further comprises the steps of creating a new entry in the fourth table for the created entry in the business table by counting the number accesses to each of the classification tables to define the order that the classification tables are to be accessed; and inserting a pointer into the created entry in the business table to point to the new entry in the fourth table.

26. The method of claim 16 wherein the the step of designating comprises the step of accessing a correlation table with the business type and item code to designate the category.

27. The method of claim 25 further comprises the step of transmitting the categories and sums, the plurality of first tables, the plurality of second tables, and business table to a personal computer.

28. The method of claim 27 wherein the personal computer performs the steps of allowing the user of the personal computer to designate a business sector and a business code for each entry in the plurality of second tables in response to the plurality of second tables; and updating each classification table whose business sector was designated with the item name and the item code for the entry in the plurality of second tables that caused the designation.

29. The method of claim 28 wherein the personal computer further performs the step of updating the correlation table in response to the updating of each classification table.

30. The method of claim 29 wherein the personal computer further performs the step of updating the business table in response to the updating of each classification table.

* * * * *